US011565974B2

(12) United States Patent
Geisler et al.

(10) Patent No.: US 11,565,974 B2
(45) Date of Patent: Jan. 31, 2023

(54) GRANULAR THERMAL INSULATION MATERIAL AND METHOD FOR PRODUCING THE SAME

(71) Applicant: EVONIK OPERATIONS GMBH, Essen (DE)

(72) Inventors: Matthias Geisler, Nörten-Hardenberg (DE); Ann-Kathrin Herr, Hanau (DE); Christian Moers, Mainz (DE); Gabriele Gärtner, Hanau (DE)

(73) Assignee: Evonik Operations GmbH, Essen (DE)

( * ) Notice: Subject to any disclaimer, the term of this patent is extended or adjusted under 35 U.S.C. 154(b) by 625 days.

(21) Appl. No.: 16/478,169

(22) PCT Filed: Jan. 18, 2018

(86) PCT No.: PCT/EP2018/051142
§ 371 (c)(1),
(2) Date: Jul. 16, 2019

(87) PCT Pub. No.: WO2018/134275
PCT Pub. Date: Jul. 26, 2018

(65) Prior Publication Data
US 2020/0031720 A1 Jan. 30, 2020

Related U.S. Application Data

(60) Provisional application No. 62/482,943, filed on Apr. 7, 2017.

(30) Foreign Application Priority Data

Jan. 18, 2017 (EP) ..................... 17151995
Apr. 20, 2017 (EP) ..................... 17167175

(51) Int. Cl.
C04B 35/14 (2006.01)
C04B 35/626 (2006.01)
C04B 35/64 (2006.01)
C04B 41/00 (2006.01)
C04B 41/45 (2006.01)
C04B 41/49 (2006.01)
C04B 41/84 (2006.01)
F16L 59/02 (2006.01)

(52) U.S. Cl.
CPC ........ *C04B 35/14* (2013.01); *C04B 35/62695* (2013.01); *C04B 35/64* (2013.01); *C04B 41/009* (2013.01); *C04B 41/4556* (2013.01); *C04B 41/4922* (2013.01); *C04B 41/4933* (2013.01); *C04B 41/4944* (2013.01); *C04B 41/84* (2013.01); *F16L 59/02* (2013.01); *C04B 2235/3418* (2013.01); *C04B 2235/3826* (2013.01); *C04B 2235/5409* (2013.01); *C04B 2235/656* (2013.01); *C04B 2235/77* (2013.01); *C04B 2235/96* (2013.01); *C04B 2235/9607* (2013.01)

(58) Field of Classification Search
CPC .......... F16L 59/02; F16L 59/04; C04B 35/14; C04B 35/62695; C04B 35/65; C04B 41/009; C04B 41/4556; C04B 41/4944; C04B 41/84; C04B 2235/3418; C04B 2235/3826; C04B 2235/656; C04B 2235/77; C04B 2235/9607
See application file for complete search history.

(56) References Cited

U.S. PATENT DOCUMENTS

| 2,595,262 | A | 5/1952 | Hood |
| 3,532,473 | A | 10/1970 | Biegler et al. |
| 3,574,027 | A | 4/1971 | Bonnet |
| 4,048,290 | A | 9/1977 | Lee |
| 4,175,159 | A | 11/1979 | Raleigh |
| 4,212,925 | A | 7/1980 | Kratel et al. |
| 4,247,708 | A | 1/1981 | Tsutsumi et al. |
| 4,286,990 | A | 9/1981 | Kleinschmidt et al. |
| 4,297,143 | A | 10/1981 | Kleinschmidt et al. |
| 5,086,031 | A | 2/1992 | Deller et al. |
| 5,183,710 | A | 2/1993 | Gerbino |
| 5,362,541 | A | 11/1994 | Sextl et al. |
| 5,458,916 | A | 10/1995 | Kratel et al. |
| 5,556,689 | A | 9/1996 | Kratel et al. |
| 5,565,142 | A | 10/1996 | Deshpande et al. |

(Continued)

FOREIGN PATENT DOCUMENTS

| CA | 2 201 186 | 9/1997 |
| CN | 106830878 | 6/2017 |

(Continued)

OTHER PUBLICATIONS

English language translation of the International Search Report for PCT/EP2018/051142, international counterpart of U.S. Appl. No. 16/478,169, filed Jan. 18, 2018.
English language translation of the Written Opinion of the International Searching Authority for for PCT/EP2018/051142, international counterpart of U.S. Appl. No. 16/478,169, filed Jan. 18, 2018.
Partial English language translation of the International Preliminary Report on Patentability for for PCT/EP2018/051142, international counterpart of U.S. Appl. No. 16/478,169, filed Jan. 18, 2018.
European Search Report and Search Opinion with partial machine translation of Search Opinion for related EP 17 15 1995.

(Continued)

*Primary Examiner* — C Melissa Koslow
(74) *Attorney, Agent, or Firm* — Law Office of: Michael A. Sanzo, LLC

(57) ABSTRACT

The present invention relates to a granular thermal insulation material comprising hydrophobized silicon dioxide and at least one IR opacifier, having a tamped density of up to 250 g/l and a compressive strength according to DIN EN 826: 2013 at 50% compression of 150 to 300 kPa or greater than 300 kPa, to processes for production thereof and to the use thereof for thermal insulation.

20 Claims, 1 Drawing Sheet

(56) References Cited

U.S. PATENT DOCUMENTS

| | | | |
|---|---|---|---|
| 5,589,245 | A | 12/1996 | Roell |
| 5,685,932 | A | 11/1997 | Stohr et al. |
| 5,776,240 | A | 7/1998 | Deller et al. |
| 6,099,749 | A | 8/2000 | Boes et al. |
| 6,174,926 | B1 | 1/2001 | Menon et al. |
| 6,268,423 | B1 | 7/2001 | Mayer et al. |
| 6,303,256 | B1 | 10/2001 | Kerner et al. |
| 6,472,067 | B1 | 10/2002 | Hsu et al. |
| 7,241,336 | B2 | 7/2007 | Scharfe et al. |
| 7,562,534 | B2 | 7/2009 | Jibb et al. |
| 7,674,476 | B1 | 3/2010 | Schwertfeger et al. |
| 7,780,937 | B2 | 8/2010 | Meyer et al. |
| 7,842,269 | B2 | 11/2010 | Schachtely et al. |
| 7,855,248 | B2 | 12/2010 | Stenzel et al. |
| 8,389,617 | B2 | 3/2013 | Meyer et al. |
| 8,603,353 | B2 | 12/2013 | Menzel et al. |
| 8,962,519 | B2 | 2/2015 | Heindl et al. |
| 9,055,748 | B2 | 6/2015 | Feucht et al. |
| 9,233,986 | B2 | 1/2016 | Kratel et al. |
| 9,540,247 | B2 | 1/2017 | Stenzel et al. |
| 9,593,797 | B2 | 3/2017 | Kulprathipanja et al. |
| 9,784,402 | B2 | 10/2017 | Menzel |
| 9,878,911 | B2 | 1/2018 | Maisels et al. |
| 10,179,751 | B2 * | 1/2019 | Geisler ............... C04B 41/4519 |
| 10,618,815 | B2 | 4/2020 | Hindelang et al. |
| 10,618,849 | B2 | 4/2020 | Albinus et al. |
| 2003/0095905 | A1 | 5/2003 | Scharfe et al. |
| 2006/0027227 | A1 | 2/2006 | Everett et al. |
| 2007/0220904 | A1 | 9/2007 | Jibb et al. |
| 2008/0277617 | A1 | 11/2008 | Abdul-Kader et al. |
| 2010/0146992 | A1 | 6/2010 | Miller |
| 2010/0300132 | A1 | 12/2010 | Schultz |
| 2012/0064345 | A1 | 3/2012 | Gini |
| 2012/0286189 | A1 | 11/2012 | Barthel et al. |
| 2013/0071640 | A1 | 3/2013 | Szillat |
| 2014/0150242 | A1 | 6/2014 | Kratel et al. |
| 2014/0230698 | A1 | 8/2014 | Stepp et al. |
| 2015/0000259 | A1 | 1/2015 | Dietz |
| 2016/0082415 | A1 | 3/2016 | Drexel et al. |
| 2016/0084140 | A1 | 3/2016 | Dietz |
| 2016/0223124 | A1 | 8/2016 | Kulprathipanja et al. |
| 2016/0258153 | A1 | 9/2016 | Koebel et al. |
| 2016/0326003 | A1 | 11/2016 | Ishizuka et al. |
| 2017/0233297 | A1 | 8/2017 | Albinus et al. |
| 2017/0268221 | A1 | 9/2017 | Geisler et al. |
| 2018/0001576 | A1 | 1/2018 | Koebel et al. |
| 2018/0065892 | A1 | 3/2018 | Geisler et al. |
| 2019/0002356 | A1 | 1/2019 | Hebalkar et al. |
| 2019/0276358 | A1 | 9/2019 | Schultz et al. |
| 2019/0382952 | A1 | 12/2019 | Geisler et al. |
| 2020/0062661 | A1 | 2/2020 | Geisler et al. |
| 2020/0124231 | A1 | 4/2020 | Geisler et al. |
| 2021/0039954 | A1 | 2/2021 | Numrich et al. |
| 2021/0269359 | A1 | 9/2021 | Geisler et al. |
| 2021/0292233 | A1 | 9/2021 | Numrich et al. |
| 2021/0292238 | A1 | 9/2021 | Albinus et al. |

FOREIGN PATENT DOCUMENTS

| | | |
|---|---|---|
| CN | 107814552 | 3/2018 |
| DE | 952 891 | 11/1956 |
| DE | 25 33 925 | 2/1977 |
| DE | 30 37 409 | 5/1982 |
| DE | 199 48 394 | 2/2001 |
| DE | 20 2007 013 074 | 3/2008 |
| DE | 10 2007 020 716 | 11/2008 |
| DE | 10 2007 031 635 | 1/2009 |
| DE | 10 2007 042 000 | 3/2009 |
| DE | 10 2007 051 830 | 5/2009 |
| DE | 10 2008 005 548 | 7/2009 |
| DE | 10 2008 036 430 | 2/2010 |
| DE | 10 2010 040 346 | 3/2012 |
| DE | 10 2013 016 705 | 4/2015 |
| DE | 10 2014 203 091 | 8/2015 |
| EP | 0 032 176 | 7/1981 |
| EP | 0 340 707 | 11/1989 |
| EP | 0 645 576 | 3/1995 |
| EP | 0 647 591 | 4/1995 |
| EP | O 647 591 | 4/1995 |
| EP | 0 937 755 | 8/1999 |
| EP | 1 988 228 | 11/2008 |
| EP | 1988228 | 11/2008 |
| EP | 2 028 329 | 2/2009 |
| EP | 2 204 513 | 7/2010 |
| EP | 2 910 724 | 8/2015 |
| EP | 3 403 818 | 11/2018 |
| FR | 2873677 | 2/2006 |
| GB | 919018 | 2/1963 |
| NO | 2621873 | 4/2018 |
| WO | WO 99/05447 | 2/1999 |
| WO | WO 03/064025 | 8/2003 |
| WO | WO 2005/028195 | 3/2005 |
| WO | WO 2006/097668 | 9/2006 |
| WO | WO 2010/126792 | 11/2010 |
| WO | WO 2011/066209 | 6/2011 |
| WO | WO 2011/076518 | 6/2011 |
| WO | WO 2011/083174 | 7/2011 |
| WO | WO 2012/041823 | 4/2012 |
| WO | WO 2012/044052 | 4/2012 |
| WO | WO 2012/049018 | 4/2012 |
| WO | WO 2013/053951 | 4/2013 |
| WO | WO 2014/090790 | 6/2014 |
| WO | WO 2014/095277 | 6/2014 |
| WO | WO 2015/007450 | 1/2015 |
| WO | WO 2016/045777 | 3/2016 |
| WO | WO 2016/162261 | * 10/2016 |
| WO | WO 2016/171558 | 10/2016 |
| WO | WO 2017/097768 | 6/2017 |
| WO | WO 2017/102819 | 6/2017 |
| WO | WO 2018/146137 | 8/2018 |

OTHER PUBLICATIONS

Schreiner, et al., "Intercomparison of thermal conductivity measurements on an expanded glass granulate in a wide temperature range," *International Journal of thermal Sciences* 95:99-105 (2015).

Ulmann's Encyclopedia of Industrial Chemistry, "Silica" chapter, published online on Apr. 15, 2008, DOI: 10.1002/14356007.a23_583.pub3.

U.S. Appl. No. 16/339,081, filed Apr. 3, 2019 US-2019/0276358 A, Sep. 12, 2019, Schultz.

U.S. Appl. No. 16/484,368, filed Aug. 7, 2019, Not yet published, Geisler.

U.S. Appl. No. 16/605,342, filed Oct. 15, 2019, Not yet published, Geisler.

Mathias, et al., "Basic characteristics and applications of aerosil: 30. The chemistry and physics of the aerosil surface," *Journal of Colloid and Interface Science* 725:61-68 (1988).

Pajonk, et al., "Physical properties of silica gels and aerogels prepared with new polymeric precursors," *J. Non-Cryst. Solids* 186(2):1-8 (Jun. 1995).

Somana, Chotangada Gautham, "Evaluation of Aerogel Composite Insulations by Characterization and Experimental Methods," Thesis; B.Eng., R.V. College of Engineering, Banglore, India, (2012).

U.S. Appl. No. 16/978,164, filed Sep. 3, 2020, US-2021/0039954 A1, Feb. 11, 2021, Numrich.

U.S. Appl. No. 17/260,345, filed Jan. 14, 2021, Numrich.

U.S. Appl. No. 17/260,227, filed Jan. 14, 2021, Geisler.

U.S. Appl. No. 17/260,371, filed Jan. 14, 2021, Albinus.

U.S. Appl. No. 16/620,481, filed Dec. 6, 2019, Geisler.

Restriction Requirement dated Sep. 9, 2020, for copending U.S. Appl. No. 16/339,081.

Response to Restriction Requirement filed Nov. 8, 2020, for copending U.S. Appl. No. 16/339,081.

U.S. Appl. No. 17/802,656, filed Aug. 26, 2022, Gärtner.

* cited by examiner

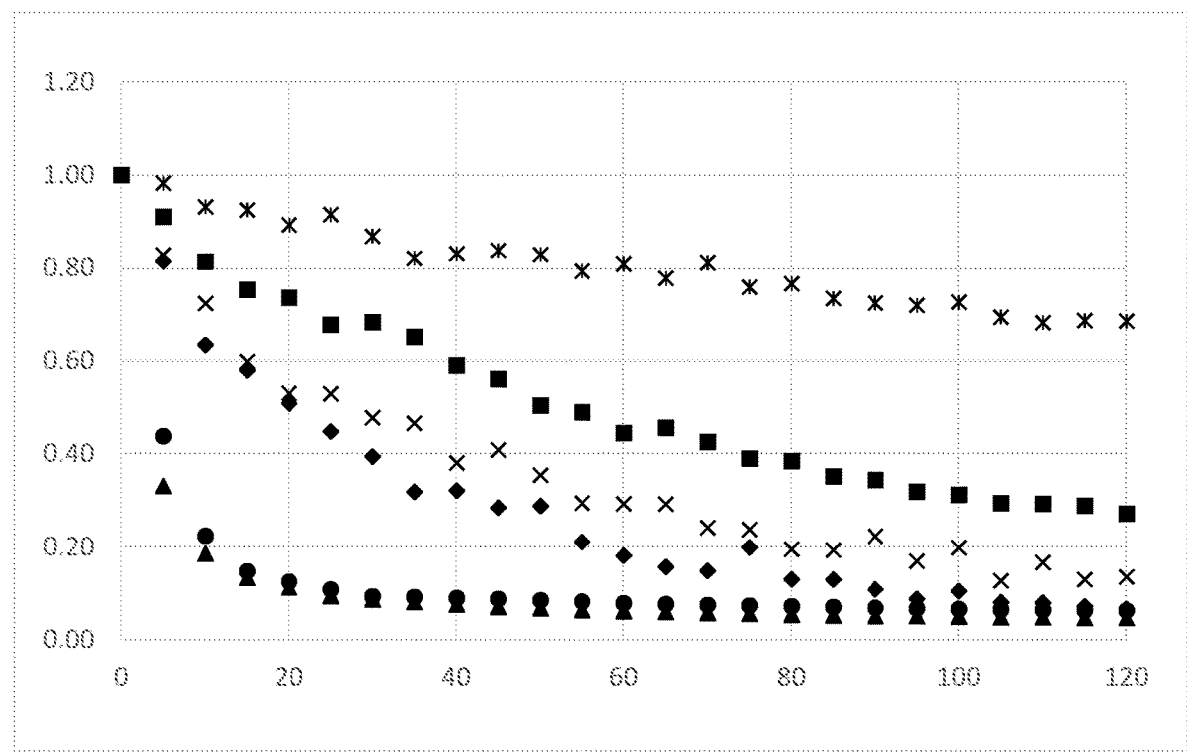

GRANULAR THERMAL INSULATION MATERIAL AND METHOD FOR PRODUCING THE SAME

CROSS REFERENCE TO RELATED APPLICATIONS

The present application is US national stage of international application PCT/EP2018/051142, which had an international filing date of Jan. 18, 2018, and which was published on Jul. 26, 2018. The application claims the benefit of U.S. 62/482,943, filed on Apr. 7, 2017 and priority to EP 17151995.2, filed on Jan. 18, 2017 and EP 17167175.3, filed on Apr. 20, 2017.

FIELD OF THE INVENTION

The present invention relates to a granular material having improved mechanical stability, and to processes for production thereof and to use of such a material for thermal insulation.

BACKGROUND OF THE INVENTION

Effective thermal insulation of houses, industrial plants, pipelines and suchlike is an important economic problem. The majority of insulation materials based on organic substances, such as polyurethane foams, are combustible and only usable at restricted temperatures. These disadvantages are not exhibited by the hitherto less widespread thermal insulation materials based on inorganic oxides, for example highly porous silicon dioxide. In the case of use of such materials for thermal insulation, by contrast, the optimization of the mechanical properties, for example particle size and mechanical stability, plays a major role.

Such silicon dioxide-based thermal insulation materials are typically based on what are called the aerogels, and also precipitated or fumed silicas. More detailed information relating to these silica types can be found in Ullmann's Encyclopedia of Industrial Chemistry, "Silica" chapter, published online on Apr. 15, 2008, DOI: 10.1002/14356007.a23_583.pub3.

WO 2006/097668 A1 discloses a granular thermal insulation material comprising hydrophobic fumed silicon dioxide and an opacifier, which is produced by mixing a hydrophobic silicon dioxide with opacifier and subsequent densification to give granules having a size of 0.25 to 2.5 mm. Products of this kind feature a relatively high tamped density of 250 to 450 g/l.

EP2910724A1 discloses a frame filled with thermally insulating material, comprising a mixture of hydrophobized fumed silica with a mean diameter of 1 to 100 μm and an opacifier having particle sizes of 0.1 to 25 μm, with a bulk density of 100-200 g/l. This thermally insulating material is produced by mixing of the constituents, followed by densification.

EP 0725037 A1 describes granules having a median grain diameter of 10 to 120 μm based on hydrophobic fumed silicon dioxide for use as a catalyst support. Granules of this kind have a tamped density of 260 to 570 g/l and are produced by spray-drying of a silicon dioxide-containing aqueous dispersion, treatment at temperatures of 150 to 1100° C. and subsequent hydrophobization with organosilicon compounds.

European application 16181905.7 discloses the production of a thermal insulation material comprising hydrophobic silicas and opacifiers, by treatment of a precipitated pulverulent silica with a silane, mixing with a hydrophilic fumed silica, and subsequent thermal treatment at 40-200° C. The pulverulent mixture thus obtained can optionally be densified prior to thermal treatment to give a granular material having a tamped density of 100-400 g/l.

DE 2903487 A1 discloses a process for producing pulverulent hydrophobic silicon dioxides by the treatment of hydrophilic silicas with organosilicon compounds in the presence of ammonia.

U.S. Pat. No. 6,099,749 discloses a process for producing finely divided compacted compositions comprising hydrophilic silicas which have been treated with ammonia prior to the compacting.

Although the silicon dioxide-based pulverulent and granular thermal insulation materials known to date do give adequate thermal insulation, they have relatively high density and/or are not optimized in terms of mechanical stability.

SUMMARY OF THE INVENTION

The problem addressed by the present invention was that of providing a hydrophobic thermal insulation material in a simple and practically easy-to-use form, which has very good mechanical stability and abrasion properties combined with simultaneously low densities and hence low use costs.

This object was achieved by provision of a granular material comprising hydrophobized silicon dioxide and at least one IR opacifier, having a tamped density of up to 250 g/l and a compressive strength according to DIN EN 826: 2013 at 50% compression of 150 to 300 kPa or greater than 300 kPa, where the compressive strength is measured on a bed with a square face having an edge length of 200 mm and bed height 20 mm.

BRIEF DESCRIPTION OF THE DRAWINGS

The FIGURE shows the decrease in the $d_{50}$ quotient (dimensionless, plotted on the Y axis) during the ultrasound treatment time (in seconds, plotted on the X axis). The individual test series are identified as follows:
Comparative Example 1—triangle (▲);
Comparative Example 2—star (X);
Comparative Example 3—X (x);
Comparative Example 4—circle (●);
Example 1—square (■)
Example 2—rhombus (◆)

DETAILED DESCRIPTION OF THE INVENTION

In the present invention, the term "granular material" is understood to mean a grainy, readily pourable, free-flowing solid material.

Tamped densities of various pulverulent or coarse-grain granular materials can be determined according to DIN ISO 787-11:1995 "General methods of test for pigments and extenders—Part 11: Determination of tamped volume and apparent density after tamping". This involves measuring the apparent density of a bed after agitation and tamping. The granular material of the invention has a tamped density of up to 250 g/l, preferably of 50 to 250 g/l, preferably of 100 to 240 g/l, more preferably of 130 to 230 g/l.

Mechanical strength of the granular material of the invention can be measured by means of the measurement of the compressive stress that arises under pressure in the bed consisting of such materials. Such a measurement of compressive strength is made in accordance with DIN EN 826:2013 "Thermal insulating products for building applications—Determination of compression behaviour". The standard method according to this standard specification is determining the compressive strength of sheets at 10% compression. This is less optimal in the case of bulk materials than in the case of sheets because of an inherently excessive roughness at the bed surface. This roughness would increase the measurement inaccuracy too significantly when the degrees of compression are too small, for example at 10% compression. Consequently, in the present application, the measurement of compressive strength was undertaken according to DIN EN 826:2013 at 50% compression, where the compressive strength is measured on a bed with a square face with edge length of 200 mm and bed height 20 mm. The lateral edging took the form of a flexible foam that keeps the sample in position during the preparation.

A compressive force is measured here at 50% compression, which can be converted to a compressive strength over the area of the sample:

$$\sigma_{50}=F_{50}/A,$$

where $\sigma_{50}$ is a compressive strength in Pa at compression $\varepsilon=50\%$; $F_{50}$—a measured compression force in N; A—a cross-sectional area of the specimen in $m^2$ (in the present case A=0.04 $m^2$).

Compression $\varepsilon$ is defined here as the ratio of the reduction in thickness of the specimen (in the present case, bed consisting of the granular material of the invention) to its starting thickness, measured in stress direction.

In a preferred embodiment of the invention, the granular material of the invention has a compressive strength according to DIN EN 826:2013 at 50% compression of 150 to 300 kPa, preferably of 170 to 300 kPa, more preferably of 200 to 300 kPa, most preferably of 250 to 300 kPa, where the compressive strength is measured on a bed with a square face, having edge length 200 mm and bed height 20 mm.

In another preferred embodiment of the invention, the granular material of the invention has a compressive strength according to DIN EN 826:2013 at 50% compression of greater than 300 kPa, preferably of 300 to 5000 kPa, more preferably of 400 to 2500 kPa, especially preferably of 500 to 2000 kPa, most preferably of 600 to 1500 kPa, where the compressive strength is measured on a bed with a square face, having edge length 200 mm and bed height 20 mm.

A numerical median particle size of the granular material of the invention can be determined according to ISO 13320:2009 by laser diffraction particle size analysis. The resulting measured particle size distribution is used to define the median $d_{50}$, which reflects the particle size not exceeded by 50% of all particles, as the numerical median particle size. The granular material of the invention may have a $d_{50}$ of greater than 10 μm, is preferably from 20 to 4000 μm, more preferably from 50 to 3500 μm, especially preferably from 100 to 3000 μm, most preferably from 150 to 2500 μm.

The granular material of the present invention preferably comprises only the particles with a size of not more than 6000 μm, preferably 50 to 5000 μm, more preferably of 200 to 4000 μm, determined by dynamic image analysis according to ISO 13322-2:2006. Most preferably, the granular material of the invention is free of particles smaller than 200 μm.

The granular material of the invention may have a BET surface area of greater than 20 $m^2$/g, preferably of 30 to 500 $m^2$/g, more preferably of 50 to 400 $m^2$/g, most preferably of 70 to 350 $m^2$/g. The specific surface area, also referred to simply as BET surface area, is determined according to DIN 9277:2014 by nitrogen adsorption in accordance with the Brunauer-Emmett-Teller method.

The granular material of the invention comprises hydrophobized silicon dioxide. The term "hydrophobic" in the context of the present invention relates to the particles having a low affinity for polar media such as water. The hydrophilic particles, by contrast, have a high affinity for polar media such as water. The hydrophobicity of the hydrophobic materials can typically be achieved by the application of appropriate nonpolar groups to the silica surface. The extent of the hydrophobicity of a hydrophobic silica can be determined via parameters including its methanol wettability, as described in detail, for example, in WO2011/076518 A1, pages 5-6. In pure water, a hydrophobic silica separates completely from the water and floats on the surface thereof without being wetted with the solvent. In pure methanol, by contrast, a hydrophobic silica is distributed throughout the solvent volume; complete wetting takes place. In the measurement of methanol wettability, a maximum methanol content at which there is still no wetting of the silica is determined in a methanol/water test mixture, meaning that 100% of the silica used remains separate from the test mixture after contact with the test mixture, in unwetted form. This methanol content in the methanol/water mixture in % by weight is called methanol wettability. The higher the level of such methanol wettability, the more hydrophobic the silica. The lower the methanol wettability, the lower the hydrophobicity and the higher the hydrophilicity of the material.

The granular material of the invention has a methanol wettability of methanol content greater than 5%, preferably of 10% to 80%, more preferably of 15% to 70%, especially preferably of 20% to 65%, most preferably of 25% to 60%, by weight in a methanol/water mixture.

The granular material according to the invention comprises at least one IR opacifier. Such an IR opacifier reduces the infrared transmittance of a heat-insulating material and thus minimizes the heat transfer due to radiation.

Preferably, the IR opacifier is selected from the group consisting of silicon carbide, titanium dioxide, zirconium dioxide, ilmenites, iron titanates, iron oxides, zirconium silicates, manganese oxides, graphites, carbon blacks and mixtures thereof. The particle size of the opacifiers is generally between 0.1 and 25 μm.

The granular material of the present invention may contain from 30% to 95%, preferably from 40% to 90%, more preferably from 50% to 85%, by weight of the silicon dioxide, and from 5% to 50%, preferably from 10% to 40%, more preferably from 15% to 30%, by weight of the opacifier.

The granular material of the present invention features excellent thermal insulation properties and can be used for thermal insulation.

The thermal conductivity of the granular material according to the invention can be measured according to EN 12667:2001 by the method with the hot plate and the heat flow meter instrument. The mean measurement temperature here is 10° C. and the contact pressure 250 Pa; the measurement is conducted under air atmosphere at standard pressure.

The thermal conductivity of the granular material of the invention in the form of a bed, measured according to EN 12667:2001, at a mean measurement temperature of 10° C., a contact pressure of 250 Pa under an air atmosphere and at standard pressure, is preferably less than 50 mW/(m*K), more preferably from 10 to 45, especially preferably from 15 to 40 and most preferably from 20 to 35 mW/(m*K).

The granular material of the invention comprises silicon dioxide. This silicon dioxide may include one or more commonly known types of silicas, such as the so-called aerogels, xerogels, pearlites, precipitated silicas, fumed silicas. Preferably, the granular material of the invention comprises one or more fumed silicas.

Fumed silicas are prepared by means of flame hydrolysis or flame oxidation. This involves oxidizing or hydrolysing hydrolysable or oxidizable starting materials, generally in a hydrogen/oxygen flame. Starting materials used for pyrogenic methods include organic and inorganic substances. Silicon tetrachloride is particularly suitable. The hydrophilic silica thus obtained is amorphous. Fumed silicas are generally in aggregated form. "Aggregated" is understood to mean that what are called primary particles, which are formed at first in the genesis, become firmly bonded to one another later in the reaction to form a three-dimensional network. The primary particles are very substantially free of pores and have free hydroxyl groups on their surface.

The granular material of the invention is notable for particularly high stability combined with low tamped density. This can be shown, for example, by means of the decrease in particle size of a suspension of the granules examined under defined ultrasound treatment in isopropanol, as set out in detail in the description of the working examples. This test shows that the granules according to the invention have comparable or better stability, but at low tamped density, than the materials from the prior art with comparable particle size fractions.

Thus, with the granular material of the invention, in various applications, it is often the case that undesired material abrasion and fracture is eliminated or reduced, that would otherwise lead, for example, to dust formation or other disadvantageous effects.

The granular material of the invention can be used for thermal insulation.

The granular material can preferably be used in insulation mixtures or formulations.

The corresponding thermal insulation mixtures and/or formulations may comprise at least one solvent and/or binder and/or a filler.

The solvent may be selected from the group consisting of water, alcohols, aliphatic and aromatic hydrocarbons, ethers, esters, aldehydes, ketones and mixtures thereof. Solvents used may, for example, be water, methanol, ethanol, propanol, butanol, pentane, hexane, benzene, toluene, xylene, diethyl ether, methyl tert-butyl ether, ethyl acetate, acetone.

The binder may comprise organic or inorganic substances. The binder preferably comprises reactive organic substances. Organic binders may be selected, for example, from the group consisting of (meth)acrylates, alkyd resins, epoxy resins, gum arabic, casein, vegetable oils, polyurethanes, silicone resins, wax, cellulose gum. Such reactive organic substances can lead, for example, via polymerization, cross-linking reaction or another type of chemical reaction, to curing of the thermally insulating formulation used and/or of the thermally insulating mixture.

Additionally or alternatively to the organic binder, the thermally insulating formulation and/or the thermally insulating mixture may comprise inorganic curable substances. Inorganic binders, also referred to as mineral binders, have essentially the same function as the organic binders: that of binding admixtures to one another. In addition, inorganic binders are divided into non-hydraulic binders and hydraulic binders. Nonhydraulic binders are water-soluble binders such as white lime, dolomite lime, gypsum and anhydrite, which cure solely under air. Hydraulic binders are binders that cure under air and under water and are insoluble in water after curing. These include hydraulic limes, cements, and render and masonry binders.

The present invention further provides a process (A) for producing a granular material comprising hydrophobized silicon dioxide and at least one IR opacifier, comprising the following steps:
a) mixing a hydrophilic silicon dioxide with at least one IR opacifier;
b) densifying the mixture obtained in step a) to give a granular material;
c) subjecting the granular material produced in step b) to thermal treatment at a temperature of 200 to 1200° C.;
d) hydrophobizing the granular material subjected to thermal treatment in step c) with a hydrophobizing agent.

The invention also provides a further process (B) for producing a granular material comprising hydrophobized silicon dioxide and at least one IR opacifier, comprising the following steps:
a) mixing a hydrophilic silicon dioxide with at least one IR opacifier;
b) densifying the mixture obtained in step a) to give a granular material;
c) treating the granular material produced in step b) with ammonia;
d) hydrophobizing the granular material treated with ammonia in step c) with a hydrophobizing agent.

The above-described granular material according to the invention can be produced, for example, by process (A) or (B).

Steps a) and b) of the processes (A) and (B) according to the invention can be conducted as individual, separate stages, or alternatively in combination in one process step.

Mixing of the hydrophilic silicon dioxide with at least one IR opacifier as per step b) of process (A) or process (B) can be conducted with all suitable mixing apparatus known to those skilled in the art.

Densification of the mixture obtained in step a) to give a granular material as per step b) of process (A) or process (B) can be conducted by deaeration or compaction.

Thermal treatment of the granular material produced in step b) in process (A) can be conducted at temperatures of 200 to 1500° C., preferably of 400 to 1400° C., preferably of 500 to 1200° C., more preferably of 600 to 1100° C., most preferably of 800 to 1100° C.

In step c) of process (B) according to the invention, the treatment of the granular material produced in step b) with ammonia takes place, preferably gaseous ammonia. The duration over which step c) of process (B) according to the invention is conducted depends upon factors including the composition of the shaped thermal insulation body and the thickness thereof. The duration is generally from 10 minutes to 100 hours, preferably 0.5 to 20 hours. Preferred temperatures here are in the range from 0 to 200° C., more preferably from 20 to 100° C.

For the treatment with ammonia in step c) of process (B) according to the invention, ammonia can be introduced into the chamber envisaged for the purpose together with the granular material to be treated. The chamber merely has to meet the requirement that it is capable of maintaining the pressures and temperatures necessary in the process according to the invention. The pressure differential $\Delta p = p2 - p1$, with p1=pressure in the chamber prior to introduction of the gaseous ammonia, p2=pressure in the chamber at which the introduction of the gaseous ammonia is stopped, is preferably more than 20 mbar, more preferably from 50 mbar to 5 bar, especially preferably from 100 mbar to 500 mbar, most preferably from 200 mbar to 400 mbar.

In addition to ammonia, in step c) of process (B), steam can be added to the granular material produced beforehand, preferably at a relative vapour pressure of 50% to 95%.

The hydrophobizing agent used in step d) of process (A) or (B) may comprise a silicon compound which is preferably selected from the group consisting of halosilanes, alkoxysilanes, silazanes and siloxanes.

A silicon compound of this kind is more preferably a liquid compound having at least one alkyl group and a boiling point of less than 200° C. It is preferably selected from the group consisting of $CH_3SiCl_3$, $(CH_3)_2SiCl_2$, $(CH_3)_3SiCl$, $C_2H_5SiCl_3$, $(C_2H_5)_2SiCl_2$, $(C_2H_5)_3SiCl$, $C_3H_8SiCl_3$, $CH_3Si(OCH_3)_3$, $(CH_3)_2Si(OCH_3)_2$, $(CH_3)_3SiOCH_3$, $C_2H_5Si(OCH_3)_3$, $(C_2H_5)_2Si(OCH_3)_2$, $(C_2H_5)_3SiOCH_3$, $C_8H_{15}Si(OC_2H_5)_3$, $C_8H_{15}Si(OCH_3)_3$, $(H_3C)_3SiNHSi(CH_3)_3$ and mixtures thereof. Particular preference is given to $(H_3C)_3SiNHSi(CH_3)_3$ and $(CH_3)_2SiCl_2$.

In the process (A) or (B) according to the invention, step b) and/or c) and/or d) may be followed by a separation of fractions of the granular material of different size from one another in such a way that only one or more fractions having particular particle sizes are separated off and used further.

EXAMPLES

Comparative Examples 1-3

Mixing

Silcar G14 silicon carbide (ESK-SiC GmbH), 20% by weight, and AEROSIL® R974 dimethyldichlorosilane-hydrophobized silica (BET=200 m²/g, manufacturer: EVONIK Resource Efficiency GmbH), 80% by weight, were mixed by means of a Minox PSM 300 HN/1 MK ploughshare mixer.

Densification

The mixture of AEROSIL® R974 with silicon carbide produced above was densified with a Grenzebach densifying roll (Vacupress VP 160/220). The tamped density of the product was adjusted via the contact pressure, the roll speed and the reduced pressure applied.

Compaction

By means of the Bepex Pharmapaktor L200/50P roll compactor, the mixture densified beforehand was then compacted once again to give granules that are easy to handle. The speed, contact pressure and vacuum here were adjusted correspondingly.

Sieving/Fractionation

In order to obtain desired fractions, the compacted granular material was first fed to an oscillating sieve mill with mesh size 3150 μm (manufacturer: FREWITT), in order to establish an upper particle limit and hence remove the particles larger than this upper limit. This was followed by the desired fractionation of the particle fractions, for example from 200 to 1190 μm or from 1190 to 3150 μm. This was done using a vibrating sieve from Sweco, model LS18S.

The sieved granules thus obtained were not subjected to any further treatment and had the tamped densities and other parameters reported in Table 1.

Comparative Example 4

A commercial hydrophobized granular aerogel material (manufacturer: Cabot, product name: Enova IC3120, particle size from 0.1 to 1.2 mm), in untreated form, was analysed under the same conditions as the other materials; see Table 1.

Examples 1-2

Mixing 1000F silicon carbide (Carsimet), manufacturer: Keyvest, 20% by weight, and AEROSIL® 300 hydrophilic silica (BET=300 m²/g, manufacturer: EVONIK Resource Efficiency GmbH), 80% by weight, were mixed by means of a Minox PSM 300 HN/1 MK ploughshare mixer.

Densification

The mixture of AEROSIL® 300 with silicon carbide produced above was densified with a Grenzebach densifying roll (Vacupress VP 160/220). The tamped density of the granular material obtained was adjusted via the contact pressure, the roll speed and the reduced pressure applied. The vacuum applied was less than 300 mbar, absolute. The roll speed was 5 rpm, and the pressure was 2000 N.

Sintering/Hardening

The subsequent thermal hardening was effected in an XR 310 chamber kiln from Schröder Industrieöfen GmbH. For this purpose, multiple layers with a bed of height up to 5 cm were subjected to a temperature programme. The temperature ramp was 300 K/h up to the target temperature of 950° C.; the hold time was 3 hours; then the samples were cooled (without active cooling) until removal.

Hydrophobization

The final hydrophobization of the thermally hardened granules was effected at elevated temperatures over the gas phase. For this purpose, hexamethyldisilazane (HMDS) as hydrophobizing agent was evaporated and conducted through by the reduced pressure process in accordance with the process from Example 1 of WO 2013/013714 A1. The specimens were heated to more than 100° C. in a desiccator and then evacuated.

Subsequently, gaseous HMDS was admitted into the desiccator until the pressure had risen to 300 mbar. After the sample had been purged with air, it was removed from the desiccator.

Sieving/Fractionation

In order to obtain desired fractions, the thermally hardened granular material was first fed to an oscillating sieve mill with mesh size 3150 μm (manufacturer: FREWITT), in order to establish an upper particle limit and hence remove the particles larger than this upper limit. This was followed by the desired fractionation of the particle fractions, for example from 200 to 1190 μm or from 1190 to 3150 μm. This was done using a vibrating sieve from Sweco, model LS18S.

The values of tamped density, compressive strength at 50% compression and thermal conductivity that are compiled in Table 1 were measured as elucidated above in the description.

Ultrasound Measurements

The ultrasound measurements were conducted with the Retsch Horiba LA-950 Laser Particle Size Analyzer from Horiba. Test method: Mie scattering theory, measurement range: 0.5 to 5000 μm. A similar process is described in WO 2014001088 A1. The samples were pretreated prior to the measurement by manually sieving off particles larger than 2500 μm, in order not to block the gap of the analyser. The amount of sample used was 1 g in each case (guided by the laser attenuation). A double determination for each sample was conducted and then a mean was calculated. The measurements showed good repeatability. The ultrasound intensity of the ultrasound standard finger installed cannot be regulated in terms of power; only the duration can be adjusted. The measurement was effected in intervals at room temperature. The $d_{50}$ is evaluated at the start of the test series and after each time interval. The "US (20 s), $d_{50}$ quotient" values compiled in Table 1 are the ratios of the $d_{50}$ values after 20 seconds of ultrasound treatment ($d_{50\ 20\ s}$) to the corresponding $d_{50}$ values at the start of the test series ($d_{50}$ start):

$$US(20\ s),\ d_{50}\ \text{quotient} = d_{50\ 20\ s}/d_{50\ start}$$

Accordingly, the higher this $d_{50}$ quotient, the more mechanically stable the granules tested.

The test results for granules with comparable particle size fractions compiled in Table 1 show that the inventive granular materials from Examples 1 and 2 have better mechanical stability than the products from Comparative Examples 1 and 4 with tamped density less than 260 g/l. Secondly, the inventive granules have comparable or even better mechanical stability than the materials from Comparative Examples 2 and 3 with tamped densities higher than 350 g/l. Accordingly, the inventive granules have a unique and economically utilizable combination of parameters.

TABLE 1

|  | Silicon dioxide raw material, % by weight | Opacifier, % by weight | Tamped density, g/l | Compressive strength at 50% compression, kPa | Fraction, μm | $D_{50}$, μm* | US (20 s) d50 quotient, μm | Thermal conductivity, mW/(m*K) |
|---|---|---|---|---|---|---|---|---|
| Comparative Example 1 | AEROSIL ® R974, 80 | SiC, 20 | 256 | 128 | <3150 | 519 | 0.11 | 25.0 |
| Comparative Example 2 | AEROSIL ® R974, 80 | SiC, 20 | 460 | 1575 | 250-600 | 500 | 0.89 | 36.9 |
| Comparative Example 3 | AEROSIL ® R974, 80 | SiC, 20 | 360 | 869 | 1000-4000 | 1842 | 0.53 | 30.0 |
| Comparative Example 4 | Aerogel granules, manufacturer: Cabot, Enova IC3120 | unknown | 105 | 119 | 100-1200 | 1233 | 0.12 | 21.0 |
| Example 1 | AEROSIL ® 300, 80 | SiC, 20 | 202 | 840 | 200-1190 | 861 | 0.74 | 28.1 |
| Example 2 | AEROSIL ® 300, 80 | SiC, 20 | 200 | 1018 | 1190-3150 | 1936 | 0.51 | 30.2 |

*All the materials tested were sieved prior to the measurement of the $d_{50}$ in order to separate off the particles larger than 2500 μm; see the description of the ultrasound measurement experiment.

The invention claimed is:

1. A granular material comprising hydrophobized silicon dioxide and at least one IR opacifier, wherein said granular material comprises:
   a) a tamped density of up to 250 g/l; and
   b) a compressive strength according to DIN EN 826:2013 at 50% compression of greater than 300 kPa, wherein the compressive strength is measured on a bed with a square face having an edge length of 200 mm and bed height 20 mm.

2. The granular material of claim 1, wherein the IR opacifier is selected from the group consisting of: silicon carbide; titanium dioxide; zirconium dioxide; ilmenites; iron titanates; iron oxides; zirconium silicates; manganese oxides; graphites; carbon blacks; and mixtures thereof.

3. The granular material of claim 1, wherein said granular material comprises a BET surface area of 50 to 400 m²/g.

4. The granular material of claim 1, wherein said granular material comprises a tamped density of 100 to 240 g/l.

5. The granular material of claim 1, wherein said granular material comprises a compressive strength according to DIN EN 826:2013 at 50% compression of greater than 300 kPa to 2000 kPa, wherein the compressive strength is measured on a bed with a square face having an edge length of 200 mm and bed height 20 mm.

6. The granular material of claim 1, wherein said granular material comprises a thermal conductivity of less than 50 mW/(m*K) according to EN 12667:2001, measured in the bed, at a mean measurement temperature of 10° C., a contact pressure of 250 Pa under an air atmosphere and at standard pressure.

7. The granular material of claim 1, wherein the silicon dioxide has been produced by pyrogenic means.

8. The granular material of claim 1, wherein said granular material comprises a methanol wettability of methanol content 10% to 60% by weight in a methanol/water mixture.

9. The granular material of claim 2, wherein said granular material comprises a BET surface area of 50 to 400 m²/g.

10. The granular material of claim 2, wherein said granular material comprises a tamped density of 100 to 240 g/l.

11. The granular material of claim 2, wherein said granular material comprises a compressive strength according to DIN EN 826:2013 at 50% compression of greater than 300 kPa to 2000 kPa, wherein the compressive strength is measured on a bed with a square face having an edge length of 200 mm and bed height 20 mm.

12. The granular material of claim 2, wherein said granular material comprises a thermal conductivity of less than 50 mW/(m*K) according to EN 12667:2001, measured in the bed, at a mean measurement temperature of 10° C., a contact pressure of 250 Pa under an air atmosphere and at standard pressure.

13. The granular material of claim 12, wherein said granular material comprises a compressive strength according to DIN EN 826:2013 at 50% compression of greater than 300 kPa to 2000 kPa, wherein the compressive strength is measured on a bed with a square face having an edge length of 200 mm and bed height 20 mm.

14. The granular material of claim 13, wherein said granular material comprises a tamped density of 100 to 240 g/l.

15. The granular material of claim 2, wherein said granular material comprises a methanol wettability of methanol content 10% to 60% by weight in a methanol/water mixture.

16. A process for producing the granular material of claim 1, comprising the following steps:
   a) mixing a hydrophilic silicon dioxide with at least one IR opacifier;
   b) densifying the mixture obtained in step a) to give a granular material;
   c) either:
      i) subjecting the granular material produced in step b) to thermal treatment at a temperature of 200 to 1200° C.; or ii) treating the granular material produced in step b) with ammonia;

d) hydrophobizing the granular material produced in step c) with a hydrophobizing agent.

17. The process of claim 16, wherein step c)i) is conducted at 800-1100° C.

18. The process of claim 16 wherein, step b) and/or c) and/or d) is followed by a separation of fractions of the granular material of different size from one another.

19. The process of claim 16, wherein the hydrophobizing agent used in step d) is selected from the group consisting of halosilanes, alkoxysilanes, silazanes and siloxanes.

20. The process of claim 16, wherein the granular material comprises a thermal conductivity of less than 50 mW/(m*K) according to EN 12667:2001, measured in the bed, at a mean measurement temperature of 10° C., a contact pressure of 250 Pa under an air atmosphere and at standard pressure.

* * * * *